United States Patent
Ishikawa et al.

(10) Patent No.: US 9,827,746 B2
(45) Date of Patent: Nov. 28, 2017

(54) HEAT-SHRINKABLE MULTILAYER FILM AND HEAT SHRINKABLE LABEL

(75) Inventors: Kiyoyasu Ishikawa, Shiga (JP); Naoyuki Maruichi, Shiga (JP)

(73) Assignee: GUNZE LIMITED, Kyoto (JP)

( * ) Notice: Subject to any disclaimer, the term of this patent is extended or adjusted under 35 U.S.C. 154(b) by 0 days.

(21) Appl. No.: 14/241,339

(22) PCT Filed: Sep. 4, 2012

(86) PCT No.: PCT/JP2012/072499
§ 371 (c)(1),
(2), (4) Date: Feb. 26, 2014

(87) PCT Pub. No.: WO2013/035706
PCT Pub. Date: Mar. 14, 2013

(65) Prior Publication Data
US 2014/0220369 A1    Aug. 7, 2014

(30) Foreign Application Priority Data

Sep. 5, 2011  (JP) .................................. 2011-193269

(51) Int. Cl.
*B32B 27/08* (2006.01)
*G09F 3/04* (2006.01)
(Continued)

(52) U.S. Cl.
CPC .......... *B32B 27/08* (2013.01); *B29C 61/0616* (2013.01); *B32B 7/12* (2013.01);
(Continued)

(58) Field of Classification Search
CPC ................ B32B 27/08; B32B 2250/24; B32B 2307/412; B32B 2307/736;
(Continued)

(56) References Cited

U.S. PATENT DOCUMENTS

| | | | |
|---|---|---|---|
| 5,300,563 | A | 4/1994 | Kiang |
| 5,385,987 | A | 1/1995 | Hamazaki et al. |

(Continued)

FOREIGN PATENT DOCUMENTS

| | | |
|---|---|---|
| EP | 1 752 285 | 2/2007 |
| JP | 61-041543 | 2/1986 |

(Continued)

OTHER PUBLICATIONS

Primalloy document, retrieved Jun. 30, 2014.*
(Continued)

*Primary Examiner* — Michael B Nelson
(74) *Attorney, Agent, or Firm* — Hamre, Schumann, Mueller & Larson, P.C.

(57) ABSTRACT

The present invention provides a heat shrinkable multilayer film that has excellent adhesiveness between front and back layers and an interlayer, effectively prevents delamination, and is less likely to have white creases on folds. The present invention also provides a heat shrinkable label formed from the heat shrinkable multilayer film. The present invention relates to a heat shrinkable multilayer film, including: front and back layers each containing a polyester resin; an interlayer containing a polystyrene resin; and adhesive layers, wherein the front and back layers and the interlayer are stacked with the adhesive layers interposed therebetween, and the adhesive layers each contain 50 to 95% by weight of a polystyrene resin and 5 to 50% by weight of a polyester elastomer.

7 Claims, 2 Drawing Sheets

(51) Int. Cl.

| | | |
|---|---|---|
| *B29C 61/06* | (2006.01) | |
| *B32B 27/32* | (2006.01) | |
| *B32B 27/36* | (2006.01) | |
| *G09F 3/06* | (2006.01) | |
| *B32B 7/12* | (2006.01) | |
| *B32B 27/30* | (2006.01) | |
| *B32B 37/12* | (2006.01) | |
| *G09F 3/02* | (2006.01) | |
| *B29K 25/00* | (2006.01) | |
| *B29K 67/00* | (2006.01) | |

(52) U.S. Cl.
CPC ............ *B32B 27/308* (2013.01); *B32B 27/32* (2013.01); *B32B 27/36* (2013.01); *G09F 3/04* (2013.01); *G09F 3/06* (2013.01); *B29K 2025/06* (2013.01); *B29K 2067/00* (2013.01); *B32B 37/12* (2013.01); *B32B 2250/24* (2013.01); *B32B 2307/412* (2013.01); *B32B 2307/736* (2013.01); *B32B 2325/00* (2013.01); *B32B 2367/00* (2013.01); *B32B 2439/60* (2013.01); *B32B 2439/66* (2013.01); *G09F 2003/0239* (2013.01); *G09F 2003/0255* (2013.01); *G09F 2003/0257* (2013.01); *Y10T 428/31797* (2015.04)

(58) Field of Classification Search
CPC ............ B32B 2325/00; B32B 2367/00; B32B 2439/60; B32B 2439/66; B32B 27/308; B32B 27/32; B32B 27/36; B32B 37/12; B32B 7/12; B65D 23/0878; B29C 61/0616; B29K 2025/06; B29K 2067/00; G09F 2003/0239; G09F 2003/0255; G09F 2003/0257; G09F 3/04; G09F 3/06; Y10T 428/31797
USPC .................................................. 428/410, 420
See application file for complete search history.

(56) References Cited

U.S. PATENT DOCUMENTS

| | | | |
|---|---|---|---|
| 5,543,474 | A | 8/1996 | Kawaki et al. |
| 5,550,190 | A | 8/1996 | Hasegawa |
| 8,691,394 | B2 | 4/2014 | Maruichi |
| 8,962,113 | B2 | 2/2015 | Yamada |
| 9,028,933 | B2 | 5/2015 | Maruichi |
| 2001/0041772 | A1 | 11/2001 | Masubuchi |
| 2002/0147273 | A1 | 10/2002 | Patel |
| 2003/0017223 | A1 | 1/2003 | Tasaka |
| 2003/0059606 | A1 | 3/2003 | Iijima |
| 2004/0171766 | A1 | 9/2004 | Agrawal |
| 2008/0026170 | A1* | 1/2008 | Yamada et al. ............... 428/34.9 |
| 2008/0057236 | A1 | 3/2008 | Yamada |
| 2008/0090036 | A1 | 4/2008 | Hiruma |
| 2009/0074998 | A1 | 3/2009 | Hiruma |
| 2009/0202851 | A1* | 8/2009 | Maruichi et al. ............. 428/483 |
| 2009/0280341 | A1 | 11/2009 | Maruichi et al. |
| 2013/0224412 | A1 | 8/2013 | Muta et al. |
| 2013/0337278 | A1 | 12/2013 | Ishikawa |
| 2014/0162077 | A1 | 6/2014 | Maruichi |
| 2014/0220369 | A1 | 8/2014 | Ishikawa |

FOREIGN PATENT DOCUMENTS

| | | | |
|---|---|---|---|
| JP | 10-080977 | | 3/1998 |
| JP | 10-130451 | | 5/1998 |
| JP | 2002046231 | | 2/2002 |
| JP | 2002-155135 | | 5/2002 |
| JP | 2002-351332 | | 12/2002 |
| JP | 2004-001252 | | 1/2004 |
| JP | 2004-276600 | | 10/2004 |
| JP | 2006-015745 | | 1/2006 |
| JP | 2006-159903 | | 6/2006 |
| JP | 2006-315416 | | 11/2006 |
| JP | 2008-037093 | | 2/2008 |
| JP | 2009-000898 | * | 2/2009 |
| JP | 2009-220522 | | 10/2009 |
| JP | 2010-241055 | | 10/2010 |
| JP | 2010-264657 | | 11/2010 |
| JP | 2010-264657 | * | 12/2010 |
| JP | 2011-056736 | | 3/2011 |
| WO | 2005/118288 | | 12/2005 |
| WO | 2012/070130 | | 5/2012 |

OTHER PUBLICATIONS

Machine translation of JP 2009-000898, retrieved Apr. 16, 2015.*
Translated Abstract of JP 2009-000898, retrieved Apr. 16, 2015.*
Machine translation of JP 2010-264657, retrieved Mar. 3, 2017.*
"Grades & Material Properties of PELPRENE™", (www.toyobo-global.com) webpage retrieved Oct. 21, 2011.

* cited by examiner

HEAT-SHRINKABLE MULTILAYER FILM AND HEAT SHRINKABLE LABEL

TECHNICAL FIELD

The present invention relates to a heat shrinkable multilayer film that has excellent adhesiveness between front and back layers and an interlayer, effectively prevents delamination, and is less likely to have white creases on folds. The present invention also relates to a heat shrinkable label formed from the heat shrinkable multilayer film.

BACKGROUND ART

Heat shrinkable labels, which are prepared by printing images and the like on a base film made of heat shrinkable resin, are attached to various containers such as PET bottles and metal cans these days.

For such heat shrinkable labels, polystyrene resin films are often used because of their excellent low-temperature shrinkability. Polystyrene resin films, however, have insufficient heat resistance and insufficient solvent resistance. To solve these problems, use of polyester resin films excellent in heat resistance and solvent resistance are attempted. Polyester resin films, however, are poor in low-temperature shrinkability and rapidly shrink. This easily causes heat shrinkable labels to suffer creases upon attaching the labels to containers. Many heat shrinkable labels have perforations so as to be easily peeled off from containers after use for container recycle, but polyester resin films are difficult to tear along the perforations.

To solve such problems, multilayer films including front and back layers each containing a polyester resin, and an interlayer containing a polystyrene resin are developed, for example. In producing multilayer films, prevention of delamination between layers is important.

One of the measures for preventing delamination between layers is to form adhesive layers between front and back layers and an interlayer. Patent Literature 1 discloses a heat shrinkable multilayer film including adhesive layers formed of an adhesive resin containing a mixture of a polyester resin and a polystyrene resin. However, such a heat shrinkable multilayer film has low adhesive strength between front and back layers and an interlayer, in other words, insufficient adhesive strength between layers.

Patent Literature 2 discloses a heat shrinkable laminate film including adhesive layers formed from an adhesive resin such as a flexible polystyrene resin with a styrene content of 10 to 50%, a modified styrene resin containing a large amount of an elastomer component, a resin that has high compatibility with polyester and thus is compatible with polyester, or a mixture of these resins.

Such heat shrinkable laminate films, however, reduce the adhesive strength between front and back layers and an interlayer after printing images on the films for producing labels, resulting in insufficient adhesive strength between layers.

Patent Literature 3 discloses a heat shrinkable multilayer film including adhesive layers formed from a polyester elastomer.

Such a heat shrinkable multilayer film, however, has white creases, which are caused by folding the film with a strong pressure in a center sealing process in producing a heat shrinkable label. The creases remain even after the heat shrinkable label is placed around a container and then heat shrunk, which spoils the appearance of the film.

CITATION LIST

Patent Literature

Patent Literature 1: JP 2006-315416 A
Patent Literature 2: JP 2006-015745 A
Patent Literature 3: JP 2008-037093 A

SUMMARY OF INVENTION

Technical Problem

The present invention aims to provide a heat shrinkable multilayer film that has excellent adhesiveness between front and back layers and an interlayer, effectively prevents delamination, and is less likely to have white creases on folds after heat shrinkage. The present invention also aims to provide a heat shrinkable label formed from the heat shrinkable multilayer film.

Solution to Problem

The present invention provides a heat shrinkable multilayer film, comprising: front and back layers each containing a polyester resin; an interlayer containing a polystyrene resin; and adhesive layers, wherein the front and back layers and the interlayer are stacked with the adhesive layers interposed therebetween, and the adhesive layers each contain 50 to 95% by weight of a polystyrene resin and 5 to 50% by weight of a polyester elastomer.

The present invention will be described in detail below.

The present inventors found that stacking front and back layers each containing a polyester resin and an interlayer containing a polystyrene resin with adhesive layers each containing a polystyrene resin and a polyester elastomer at a specific mixing ratio interposed therebetween enables to provide a heat shrinkable multilayer film that has increased adhesive strength between all the layers and is less likely to have white creases on folds. Such a heat shrinkable multilayer film excellent in adhesiveness and in prevention of crease-whitening may be suitably used for heat shrinkable labels for containers such as PET bottles.

The heat shrinkable multilayer film of the present invention includes front and back layers and an interlayer.

The front and back layers herein mean both a front layer and a back layer. Thus, the heat shrinkable multilayer film of the present invention is designed such that the interlayer is sandwiched between the front layer and the back layer.

The front and back layers each contain a polyester resin.

Examples of the polyester resin include those obtainable by polycondensation of a dicarboxylic acid component and a diol component. The dicarboxylic acid component is not particularly limited. Examples thereof include o-phthalic acid, terephthalic acid, isophthalic acid, succinic acid, adipic acid, sebacic acid, azelaic acid, octylsuccinic acid, cyclohexane dicarboxylic acids, naphthalene dicarboxylic acids, fumaric acid, maleic acid, itaconic acid, and decamethylene carboxylic acids, and anhydrides thereof and lower alkyl esters thereof.

The diol component is not particularly limited. Examples thereof include aliphatic diols such as ethylene glycol, 1,3-propanediol, 1,4-butanediol, diethylene glycol, 1,5-pentanediol, 1,6-hexanediol, dipropylene glycol, triethylene glycol, tetraethylene glycol, 1,2-propanediol, 1,3-butanediol, 2,3-butanediol, neopentyl glycol(2,2-dimethylpropane-1,3-diol), 1,2-hexanediol, 2,5-hexanediol, 2-methyl-2,4-pentanediol, 3-methyl-1,3-pentanediol, 2-ethyl-1,3-hexanediol, and polytetramethylene ether glycols; and alicyclic diols such as 2,2-bis(4-hydroxycyclohexyl)propane, alkylene oxide adducts of 2,2-bis(4-hydroxycyclohexyl)propane, 1,4-cyclohexanediol, and 1,4-cyclohexane dimethanol.

Preferably, the polyester resin contains a component derived from terephthalic acid as the dicarboxylic acid component, and a component derived from at least one of ethylene glycol and 1,4-cyclohexane dimethanol as the diol component. Such a polyester resin allows a heat shrinkable multilayer film to have excellent shrinkability.

For better shrinkability, the amount of the component derived from ethylene glycol is preferably 60 to 80 mol % and the amount of the component derived from 1,4-cyclohexane dimethanol is preferably 10 to 40 mol % in 100 mol % of the diol component.

Such a polyester resin may optionally further contain a component derived from diethylene glycol in an amount of 0 to 30 mol %, preferably 1 to 25 mol %, and more preferably 2 to 20 mol %. Diethylene glycol increases the tensile elongation at break in the main shrinkage direction of a heat shrinkable multilayer film, and prevents delamination when a heat shrinkable label is torn along perforations, whereby preventing front and back layers from leaving an inner side layer thereof on a container. More than 30 mol % of the component derived from diethylene glycol may cause excessive low-temperature shrinkability of the heat shrinkable multilayer film. This causes the heat shrinkable multilayer film to easily suffer creases when it is attached to a container.

The polyester resin containing a component derived from terephthalic acid as the dicarboxylic acid component may contain a component derived from 1,4-butanediol as the diol component. Such a polyester resin is generally referred to as a polybutylene terephthalate resin.

The polybutylene terephthalate resin preferably contains a component derived from terephthalic acid as the dicarboxylic acid component, and is preferably used together with a polyester resin containing a component derived from ethylene glycol and 1,4-cyclohexane dimethanol as the diol component. Such a mixed resin may provide excellent finish quality.

Examples of the polybutylene terephthalate resin include, in addition to a polybutylene terephthalate resin consisting of a component derived from terephthalic acid and a component derived from 1,4-butanediol only, a polybutylene terephthalate resin that contains a dicarboxylic acid component other than a component derived from terephthalic acid, and/or a diol component other than a component derived from 1,4-butanediol.

The amount of the dicarboxylic acid component other than a component derived from terephthalic acid is preferably 10 mol % or less in 100 mol % of the dicarboxylic acid component. An amount of more than 10 mol % may reduce the heat resistance of the polybutylene terephthalate resin, possibly causing economic disadvantage. Additionally, the amount of the diol component other than a component derived from 1,4-butanediol is preferably 10 mol % or less in 100 mol % of the diol component. An amount of more than 10 mol % may reduce the heat resistance of the polybutylene terephthalate resin, possibly causing economic disadvantage.

The amount of the polybutylene terephthalate resin is not particularly limited, and is preferably 30% by weight or less. An amount of more than 30% by weight may increase the natural shrinkage rate or reduce the rigidity of the film.

The preferable lower limit of a Vicat softening temperature of the polyester resin forming the front and back layers is 55° C., and the preferable upper limit thereof is 95° C. A Vicat softening temperature of lower than 55° C. may cause too low a shrinkage starting temperature of the heat shrinkable multilayer film or increase the natural shrinkage rate. A Vicat softening temperature of higher than 95° C. may reduce the low-temperature shrinkability and the shrink finish quality of the heat shrinkable multilayer film, and may further reduce the low-temperature shrinkability with time. The more preferable lower limit of the Vicat softening temperature is 60° C., and the more preferable upper limit thereof is 90° C.

The Vicat softening temperature may be measured by a method in accordance with JIS-K7206 (1999).

Examples of the commercial product of the polyester resin forming the front and back layers include "Easter", "Embrace LV" (both produced by Eastman Chemical Company), "BELLPET" (produced by Bell Polyester Products, Inc.), and "NOVADURAN" (produced by Mitsubishi Engineering-Plastics Corporation).

The polyester resin in the front and back layers may be any one of polyester resins with the above compositions alone or may consist of two or more polyester resins with the above compositions. Although the front layer and the back layer may include different polyester resins with different compositions, they preferably include the same polyester resin to prevent troubles such as curling up of the film.

The front and back layers may optionally contain additives such as antioxidants, heat stabilizers, ultraviolet absorbers, light stabilizers, lubricants, antistatic agents, anti-blocking agents, fire retardants, antimicrobials, fluorescent whitening agents, and colorants.

The interlayer contains a polystyrene resin.

Examples of the polystyrene resin include aromatic vinyl hydrocarbon-conjugated diene copolymers, mixed resins of an aromatic vinyl hydrocarbon-conjugated diene copolymer and an aromatic vinyl hydrocarbon-unsaturated aliphatic carboxylate copolymer, and rubber-modified high impact polystyrenes. The polystyrene resin allows the heat shrinkable multilayer film of the present invention to start shrinking at low temperature and to have high shrinkability.

The aromatic vinyl hydrocarbon-conjugated diene copolymer herein means a copolymer containing a component derived from an aromatic vinyl hydrocarbon and a component derived from a conjugated diene.

The aromatic vinyl hydrocarbon is not particularly limited. Examples thereof include styrene, o-methylstyrene, and p-methylstyrene. These may be used alone or in combination. The conjugated diene is not particularly limited. Examples thereof include 1,3-butadiene, 2-methyl-1,3-butadiene, 2,3-dimethyl-1,3-butadiene, 1,3-pentadiene, and 1,3-hexadiene. These may be used alone or in combination.

The aromatic vinyl hydrocarbon-conjugated diene copolymer preferably contains a styrene-butadiene copolymer (SBS resin) for particularly excellent heat shrinkability. Furthermore, the aromatic vinyl hydrocarbon-conjugated diene copolymer preferably contains, as the conjugated diene, a copolymer prepared using 2-methyl-1,3-butadiene (isoprene), such as a styrene-isoprene copolymer (SIS resin) or a styrene-isoprene-butadiene copolymer (SIBS), for production of a heat shrinkable multilayer film with less fish eyes.

The aromatic vinyl hydrocarbon-conjugated diene copolymer may contain any one of SBS resin, SIS resin, or SIBS resin alone, or may contain a plurality of them in combination. In the case of using two or more of SBS resin, SIS resin, and SIBS resin, the resins may be dry-blended with each other, or the resins with predetermined compositions are knead-pelletized through an extruder and the obtained compound resin may be used.

An aromatic vinyl hydrocarbon-conjugated diene copolymer containing one or more of SBS resin, SIS resin, and SIBS resin preferably satisfies the following conditions for providing a heat shrinkable multilayer film particularly excellent in heat shrinkability. That is, the styrene content is 65 to 90% by weight and the conjugated diene content is 10 to 35% by weight in 100% by weight of the aromatic vinyl hydrocarbon-conjugated diene copolymer. A styrene content of more than 90% by weight or a conjugated diene content of less than 10% by weight may cause a heat shrinkable multilayer film to be easily torn by a tension applied thereto or to unexpectedly break during processing processes such as printing. A styrene content of less than 65% by weight or a conjugated diene content of more than 35% by weight may cause impurities such as gel during a molding process or may cause a heat shrinkable multilayer film to have poor strength, likely resulting in poor handleability.

The aromatic vinyl hydrocarbon-unsaturated aliphatic carboxylate copolymer herein means a copolymer containing a component derived from an aromatic vinyl hydrocarbon and a component derived from an unsaturated aliphatic carboxylate.

The aromatic vinyl hydrocarbon is not particularly limited, and may be the same aromatic vinyl hydrocarbon as that used for the aromatic vinyl hydrocarbon-conjugated diene copolymer. The unsaturated aliphatic carboxylate is not particularly limited. Examples thereof include methyl (meth)acrylate, butyl (meth)acrylate, 2-ethylhexyl (meth)acrylate, lauryl (meth)acrylate, and stearyl (meth)acrylate. The term "(meth)acrylate" includes both acrylate and methacrylate.

In the case where the aromatic vinyl hydrocarbon-unsaturated aliphatic carboxylate copolymer is a styrene-butyl acrylate copolymer, the styrene content is preferably 60 to 90% by weight and the butyl acrylate content is preferably 10 to 40% by weight in 100% by weight of the styrene-butyl acrylate copolymer. An aromatic vinyl hydrocarbon-unsaturated aliphatic carboxylate copolymer with such a composition enables to provide a heat shrinkable multilayer film with excellent heat shrinkability.

No particular limitation exists in the mixed resin of the aromatic vinyl hydrocarbon-conjugated diene copolymer and the aromatic vinyl hydrocarbon-unsaturated aliphatic carboxylate copolymer. The mixed resin preferably contains 80% by weight or less of the aromatic vinyl hydrocarbon-unsaturated aliphatic carboxylate copolymer.

The rubber-modified high impact polystyrene mainly contains a continuous phase of a styrene-alkyl methacrylate-alkyl acrylate terpolymer and a dispersed phase of a conjugated-diene-based rubber component.

Examples of the alkyl methacrylate forming the continuous phase include methyl methacrylate and ethyl methacrylate. Examples of the alkyl acrylate include methyl acrylate, ethyl acrylate, propyl acrylate, and butyl acrylate.

The proportion of the styrene in the terpolymer forming the continuous phase is preferably 20 to 80% by weight, and more preferably 30 to 70% by weight. The proportion of the alkyl methacrylate is preferably 10 to 50% by weight, and more preferably 15 to 40% by weight. The proportion of the alkyl acrylate is preferably 1 to 30% by weight, and more preferably 5 to 20% by weight.

The conjugated-diene-based rubber component forming the dispersed phase is preferably a polybutadiene or a styrene-butadiene copolymer containing 5 to 30% by weight of styrene.

The conjugated-diene-based rubber component forming the dispersed phase preferably has a particle size of 0.1 to 1.2 µm, and more preferably 0.3 to 0.8 µm. A particle size of smaller than 0.1 µm may cause insufficient impact resistance, whereas a particle size of greater than 1.2 µm may cause poor transparency of the interlayer.

In the rubber-modified high impact polystyrene, the proportion of the continuous phase composed of the terpolymer of styrene-alkyl methacrylate-alkyl acrylate is preferably 70 to 95% by weight, and the proportion of the dispersed phase composed of the conjugated-diene-based rubber component is preferably 5 to 20% by weight. A dispersed phase at a proportion of less than 5% by weight may cause insufficient impact resistance of the rubber-modified high impact polystyrene, whereas a dispersed phase at a proportion of more than 20% by weight may cause poor transparency of the interlayer.

The preferable lower limit of the Vicat softening temperature of the polystyrene resin is 60° C., and the preferable upper limit thereof is 85° C. A Vicat softening temperature of lower than 60° C. may cause the heat shrinkable multilayer film to have too much low-temperature shrinkability, and thus the film may easily suffer creases when it is attached to a container. A Vicat softening temperature of higher than 85° C. may cause the heat shrinkable multilayer film to have poor low-temperature shrinkability, and thus the film may easily have non-shrinking portion when it is attached to a container. The more preferable lower limit of the Vicat softening temperature is 65° C., and the more preferable upper limit thereof is 80° C. The Vicat softening temperature may be measured by a method in accordance with JIS-K7206 (1999).

The preferable lower limit of a MFR (melt flow rate) at 200° C. of the polystyrene resin is 2 g/10 min, and the preferable upper limit thereof is 15 g/10 min. A MFR at 200° C. of lower than 2 g/10 min may cause film formation to be difficult. A MFR at 200° C. of higher than 15 g/10 min may reduce the mechanical strength of the film, and such a film may not endure practical use. The more preferable lower limit of the MFR at 200° C. is 4 g/10 min, and the more preferable upper limit thereof is 12 g/10 min. The MFR may be determined by the method in accordance with ISO 1133.

Examples of the commercial product of the polystyrene resin forming the interlayer include "CLEAREN" (produced by DENKI KAGAKU KOGYO KABUSHIKI KAISHA), "Asaflex" (produced by Asahi Kasei Chemicals Corporation), "Styrolux" (produced by BASF SE), and "PSJ-polystyrene" (produced by PS Japan Corporation).

The interlayer may optionally contain additives such as antioxidants, heat stabilizers, ultraviolet absorbers, light stabilizers, lubricants, antistatic agents, anti-blocking agents, fire retardants, antimicrobials, fluorescent whitening agents, and colorants.

The heat shrinkable multilayer film of the present invention is designed such that the front and back layers and the interlayer are stacked with adhesive layers each containing 50 to 95% by weight of a polystyrene resin and 5 to 50% by weight of a polyester elastomer interposed therebetween.

Such adhesive layers enable to increase the adhesive strength between all the layers of the heat shrinkable multilayer film and also to prevent the heat shrinkable multilayer film from having white creases caused by folding the film.

The polystyrene resin used for the adhesive layers may be the same polystyrene resin as that used for the interlayer, or may be a different one. In the case of using a different polystyrene resin, it is preferably softer than the polystyrene resin used for the interlayer.

The polystyrene resin used for the adhesive layers preferably contains an aromatic vinyl hydrocarbon-conjugated diene copolymer, and more preferably contains a styrene-butadiene copolymer (SBS resin), for particularly excellent adhesiveness. Furthermore, the aromatic vinyl hydrocarbon-conjugated diene copolymer preferably contains, as the conjugated diene, a copolymer prepared using 2-methyl-1, 3-butadiene (isoprene), such as a styrene-isoprene copolymer (SIS resin) or a styrene-isoprene-butadiene copolymer (SIBS), for forming a heat shrinkable multilayer film with better adhesiveness.

The aromatic vinyl hydrocarbon-conjugated diene copolymer may contain any one of SBS resin, SIS resin, and SIBS resin alone, or may contain a plurality of them in combination. In the case of using multiple resins selected from SBS resin, SIS resin, and SIBS resin, the resins may be dry-blended with each other, or the resins with predetermined compositions are knead-pelletized through an extruder and the obtained compound resin may be used.

In the case where the polystyrene resin is an aromatic vinyl hydrocarbon-conjugated diene copolymer and contains one or more of SBS resin, SIS resin, and SIBS resin, the styrene content is preferably 50 to 90% by weight and the conjugated diene content is preferably 10 to 50% by weight in 100% by weight of the aromatic vinyl hydrocarbon-conjugated diene copolymer for producing a heat shrinkable multilayer film with excellent adhesive strength between all the layers. A styrene content of less than 50% by weight or a conjugated diene content of more than 50% by weight tends to cause impurities such as gel during a molding process. A styrene content of more than 90% by weight or a conjugated diene content of less than 10% by weight tends to reduce the adhesive strength between all the layers.

The preferable lower limit of the Vicat softening temperature of the polystyrene resin used for the adhesive layers is 55° C., and the preferable upper limit thereof is 85° C. A Vicat softening temperature of lower than 55° C. tends to cause the heat shrinkable multilayer film to suffer delamination by heat for attaching the film to a container. A Vicat softening temperature of higher than 85° C. tends to reduce the adhesive strength of the heat shrinkable multilayer film. The more preferable lower limit of the Vicat softening temperature is 60° C., the still more preferable lower limit thereof is 65° C., and the more preferable upper limit thereof is 80° C. The Vicat softening temperature may be measured by a method in accordance with JIS K7206 (1999).

The preferable lower limit of a MFR (melt flow rate) at 200° C. of the polystyrene resin used for the adhesive layers is 2 g/10 min, and the preferable upper limit thereof is 15 g/10 min. A MFR at 200° C. of lower than 2 g/10 min tends to cause resins to remain in an extruder during continuous production processes, which tends to stimulate generation of impurities such as gel. A MFR at 200° C. of higher than 15 g/10 min tends to fail to give a sufficient pressure during a film forming process, which tends to stimulate the variation of the thickness. The more preferable lower limit of the MFR at 200° C. is 4 g/10 min, and the more preferable upper limit thereof is 12 g/10 min. The MFR may be determined by a method in accordance with ISO 1133.

The lower limit of the amount of the polystyrene resin in the adhesive layers is 50% by weight, and the upper limit thereof is 95% by weight.

The polystyrene resin in an amount of less than 50% by weight may cause the film to have white creases caused by folding the film with a strong pressure in producing a heat shrinkable label, which spoils the appearance of the film. The polystyrene resin in an amount of more than 95% by weight tends to fail to give sufficient interlaminar strength, which tends to cause delamination in practical use. The preferable lower limit of the amount of the polystyrene resin is 55% by weight, the more preferable lower limit thereof is 60% by weight, the preferable upper limit thereof is 90% by weight, and the more preferable upper limit thereof is 85% by weight.

The polyester elastomer consists of a polyester as a hard segment and a polyether or a polyester as a soft segment having rich rubber elasticity. Specific examples of the polyester elastomer include a block copolymer consisting of an aromatic polyester as a hard segment and an aliphatic polyether or an aliphatic polyester as a soft segment. The polyester elastomer is preferably a saturated polyester elastomer, and more preferably a saturated polyester elastomer that contains a polyalkylene ether glycol segment as a soft segment.

Preferred examples of the saturated polyester elastomer containing a polyalkylene ether glycol segment include a block copolymer consisting of an aromatic polyester as a hard segment and a polyalkylene ether glycol as a soft segment.

If the polyester elastomer is a block copolymer consisting of an aromatic polyester and a polyalkylene ether glycol, the preferable lower limit of the amount of the polyalkylene ether glycol segment is 5% by weight, and the preferable upper limit thereof is 90% by weight. An amount of less than 5% by weight reduces the adhesiveness to the interlayer, and an amount of more than 90% by weight reduces the adhesiveness to the front and back layers. The more preferable lower limit of the amount of the polyalkylene ether glycol segment is 30% by weight, the more preferable upper limit thereof is 80% by weight, and the still more preferable lower limit thereof is 55% by weight.

Examples of the polyalkylene ether glycol include polyethylene glycol, poly(propylene ether)glycol, poly(tetramethylene ether)glycol, and poly(hexamethylene ether)glycol.

The preferable lower limit of a number average molecular weight of the polyalkylene ether glycol is 400, and the preferable upper limit thereof is 6000. The more preferable lower limit of a number average molecular weight of the polyalkylene ether glycol is 600, the more preferable upper limit thereof is 4000, the still more preferable lower limit thereof is 1000, and the still more preferable upper limit thereof is 3000. A polyalkylene ether glycol with a number average molecular weight within the above range is preferred because it may achieve favorable interlaminar strength. The number average molecular weight herein may be determined by gel permeation chromatography (GPC).

The method of producing the polyester elastomer is not particularly limited. For example, it may be produced by preparing raw materials (i) a $C_{2-12}$ aliphatic and/or alicyclic diol, (ii) an aromatic dicarboxylic acid and/or an alicyclic dicarboxylic acid, or an ester of these, and (iii) a polyalkylene ether glycol with a number average molecular weight of 400 to 6000; reacting the raw materials by an esterification reaction or a transesterification reaction to produce an oligomer; and subjecting the oligomer to polycondensation.

Examples of a $C_{2-12}$ aliphatic and/or alicyclic diol include those typically used as a raw material of a polyester, especially as a raw material of a polyester thermoplastic elastomer. Specific examples thereof include ethylene glycol, propylene glycol, trimethylene glycol, 1,4-butanediol, 1,4-cyclohexanediol, and 1,4-cyclohexane dimethanol. Preferable among these are ethylene glycol and 1,4-butanediol, and more preferable is 1,4-butanediol. These may be used alone or in combination.

Examples of an aromatic dicarboxylic acid and/or an alicyclic dicarboxylic acid include those typically used as raw materials of polyesters, especially as raw materials of polyester thermoplastic elastomers. Specific examples thereof include terephthalic acid, isophthalic acid, phthalic acid, 2,6-naphthalene dicarboxylic acid, and cyclohexane dicarboxylic acid. Preferable among these are terephthalic acid and 2,6-naphthalene dicarboxylic acid, and more preferable is terephthalic acid. These may be used alone or in combination.

Examples of the commercial product of the polyester elastomer include those under the product names of "PRIMALLOY" (produced by Mitsubishi Chemical Corporation), "PELPRENE" (produced by TOYOBO CO., LTD.), and "Hytrel" (produced by DU PONT-TORAY CO., LTD.).

The polyester elastomer preferably has a melting point of 120° C. to 200° C. A melting point of lower than 120° C. reduces the heat resistance, easily causing peeling of the film from a solvent sealed portion when the film is attached to a container as a heat shrinkable label. A melting point of higher than 200° C. may fail to provide sufficient adhesive strength. The more preferable lower limit of the melting point is 130° C., and the more preferable upper limit thereof is 190° C.

The melting point may be measured using a differential scanning calorimeter (DSC-60, produced by Shimadzu Corporation) at a rate of temperature rise of 10° C./min.

The melting point of the polyester elastomer is affected by the copolymerization ratio between a polyester as a hard segment and a polyether or a polyester as a soft segment and the structure of these segments. Typically, the melting point of a polyester elastomer is likely to depend on the copolymerization amount of a polyether or a polyester as a soft segment. A larger copolymerization amount of the polyether or the polyester reduces the melting point, whereas a smaller copolymerization amount thereof increases the melting point.

In addition, the melting point of a polyester as a hard segment that constitutes the polyester elastomer may be adjusted by changing the copolymerization components of the polyester, whereby the melting point of the entire polyester elastomer may be adjusted.

Furthermore, the melting point of a polyester elastomer tends to decrease when the molecular weight of a polyether or a polyester as a soft segment decreases because it reduces the blocking property of the polyester elastomer.

The preferable lower limit of a JIS-D hardness of the polyester elastomer is 10, and the preferable upper limit thereof is 80. A JIS-D hardness of 10 or more improves the mechanical strength of the adhesive layers. A JIS-D hardness of 80 or less improves the flexibility and the impact resistance of the adhesive layers. The more preferable lower limit of a JIS-D hardness of the polyester elastomer is 15, the more preferable upper limit thereof is 70, the still more preferable lower limit thereof is 20, and the still more preferable upper limit thereof is 60.

The JIS-D hardness may be determined by a method in accordance with JIS K 6253 using a durometer (Type D).

The preferable lower limit of a specific gravity of the polyester elastomer is 0.95, and the preferable upper limit thereof is 1.20. A specific gravity of 0.95 or more may provide heat resistance and thereby prevent peeling of a film from a solvent sealed portion when the film is attached to a container as a heat shrinkable label. A specific gravity of 1.20 or less may increase the adhesive strength between the front and back layers and the interlayer.

The more preferable lower limit of a specific gravity is 0.98, and the more preferable upper limit thereof is 1.18.

The specific gravity may be determined by a method in accordance with JIS K 7112 (1999) by a water displacement method.

The lower limit of the amount of the polyester elastomer in the adhesive layers is 5% by weight, and the upper limit thereof is 50% by weight.

The polyester elastomer in an amount of less than 5% by weight fails to provide sufficient interlaminar strength, which tends to cause delamination in practical use. The polyester elastomer in an amount of more than 50% by weight causes a film to have white creases caused by folding the film with a strong pressure, which spoils the appearance of the film. The preferable lower limit of the amount of the polyester elastomer is 10% by weight, the more preferable lower limit thereof is 15% by weight, the preferable upper limit thereof is 45% by weight, and the more preferable upper limit thereof is 40% by weight.

The adhesive layers may optionally contain additives such as antioxidants, heat stabilizers, ultraviolet absorbers, light stabilizers, lubricants, antistatic agents, anti-blocking agents, fire retardants, antimicrobials, florescent whitening agents, and colorants.

The preferable lower limit of the total thickness of the heat shrinkable multilayer film of the present invention is 10 μm, the preferable upper limit thereof is 100 μm, the more preferable lower limit thereof is 15 μm, the more preferable upper limit thereof is 80 μm, the still more preferable lower limit thereof is 20 μm, and the still more preferable upper limit thereof is 70 μm. A heat shrinkable multilayer film having a total thickness within the above range is excellent in heat shrinkability, converting properties (e.g. printing property, center sealing property), and attachability.

In the heat shrinkable multilayer film of the present invention, the preferable lower limit of the thickness of each of the front and back layers is 5% of the total thickness of the heat shrinkable multilayer film, and the preferable upper limit thereof is 25%. The preferable lower limit of the thickness of the interlayer is 50% of the total thickness of the heat shrinkable multilayer film, and the preferable upper limit thereof is 90%. The thickness of each of the front and back layers and the thickness of the interlayer within the above ranges may achieve high interlaminar strength and high transparency.

In the heat shrinkable multilayer film of the present invention, the preferable lower limit of the thickness of the adhesive layer is 0.3 μm, and the preferable upper limit thereof is 3.0 μm. An adhesive layer with a thickness of less than 0.3 μm may fail to achieve sufficient adhesiveness. An adhesive layer with a thickness of more than 3.0 μm may deteriorate the heat shrinking property and the optical property of the heat shrinkable multilayer film. The more preferable lower limit of the thickness of the adhesive layer is 0.5 μm, and the more preferable upper limit thereof is 2.0 μm.

The total thickness of the heat shrinkable multilayer film can be adjusted by subtracting the thicknesses of the adhesive layers from the total thickness and then adjusting the thicknesses of the front and back layers and the interlayer.

In the case where the heat shrinkable multilayer film of the present invention has a five-layer structure of front layer (A)/adhesive layer (E)/interlayer (B)/adhesive layer (E)/back layer (C), with a total thickness of 40 μm, the thickness of each of the front layer (A) and the back layer (C) is preferably 2.0 to 10.0 μm, and more preferably 3.0 to 8.0 μm. The thickness of each of the adhesive layers (E) is preferably 0.3 to 3.0 μm, and more preferably 0.5 to 2.0 μm. The thickness of the interlayer (B) is preferably 19.0 to 35.4 μm, and more preferably 20.0 to 33.0 μm.

The shrinkage rate in the main shrinkage direction of the heat shrinkable multilayer film of the present invention is, at 70° C. for 10 seconds, preferably 15 to 50%, more preferably 20 to 47%, still more preferably 25 to 45%, and particularly preferably 30 to 45%; at 80° C. for 10 seconds, preferably 50 to 70%, more preferably 55 to 69%, still more preferably 58 to 68%, and particularly preferably 60 to 67%; and in boiled water for 10 seconds, preferably 65 to 85%, more preferably 70 to 83%, and still more preferably 75 to 82%. Such a shrinkage rate enables to provide excellent shrink finish quality in a hot air tunnel or a steam tunnel.

The heat shrinkable multilayer film of the present invention preferably has an interlaminar strength (an adhesive strength) of 80 to 200 g/cm in a direction (machine direction or MD) orthogonal to the main shrinkage direction. An interlaminar strength of lower than 80 g/cm may cause delamination when a heat shrinkable label is attached to a container. The more preferable lower limit of the interlaminar strength is 90 g/cm, and the still more preferable lower limit thereof is 100 g/cm.

The heat shrinkable multilayer film of the present invention preferably has an interlaminar strength of 50 to 200 g/cm in the main shrinkage direction (transverse direction or TD). An interlaminar strength of less than 50 g/cm may cause delamination because of abrasion caused when containers covered with labels are transported in cardboard boxes. The more preferable lower limit of the interlaminar strength is 65 g/cm, and the still more preferable lower limit thereof is 80 g/cm.

In the heat shrinkable multilayer film of the present invention, the interlaminar strength in the MD is preferred to be higher than the interlaminar strength in the TD. Attaching a heat shrinkable label to a container by a labeler (a device capable of attaching heat shrinkable labels to containers) usually applies a tension to the label in the MD. Thus, a label with a higher interlaminar strength in the MD enables favorable attachment of a heat shrinkable label to a container.

The interlaminar strength may be measured as follows: that is, the layers of a measurement sample are separated at a 180° angle in the MD or TD, and the interlaminar strength at this time is measured using a peel tester.

The heat shrinkable multilayer film of the present invention may be produced by any method, and is preferably produced by simultaneously forming all the layers by a co-extruding method. In the case of co-extrusion with a T-die, the layers may be stacked by a feed block technique, a multi-manifold technique, or a combination use thereof.

Examples of a specific method for producing the heat shrinkable multilayer film of the present invention include the following method. That is, the material for the front and back layers, the material for the interlayer, and the material for the adhesive layers are charged into an extruder; the materials are extruded into a sheet through a multilayer die; the sheet is cooled and solidified by take-up rolls; and the sheet is uniaxially or biaxially stretched.

The sheet may be stretched by, for example, a roll stretching method, a tenter stretching method, or a combination thereof. The stretching temperature depends on the softening temperature of the resins forming the heat shrinkable multilayer film, required shrinkage properties of the film, and the like. The preferable lower limit of the stretching temperature is 65° C., the preferable upper limit thereof is 120° C., the more preferable lower limit thereof is 70° C., and the more preferable upper limit thereof is 115° C. The stretch ratio in the main shrinkage direction depends on the resins forming the film, the method of stretching the film, the stretching temperature, and the like, and the ratio is preferably three times or more, and more preferably four times or more, whereas preferably seven times or less, and more preferably six times or less. A stretching temperature and a stretch ratio within such ranges enable to achieve excellent thickness accuracy and to prevent delamination caused when the film is torn along perforations to leave only an inner side layer of the front and back layers on the container.

The usage of the heat shrinkable multilayer film of the present invention is not particularly limited. The heat shrinkable multilayer film of the present invention has high interlaminar strength, prevents delamination when the film attached to a container is scratched at an overlapped portion or torn along perforations, and has excellent transparency. Thus, the heat shrinkable multilayer film may be suitably used as base films for heat shrinkable labels attached to containers such as PET bottles and metal cans. A heat shrinkable label formed from the heat shrinkable multilayer film of the present invention is also one aspect of the present invention.

Advantageous Effects of Invention

The present invention can provide a heat shrinkable multilayer film that has excellent adhesiveness between front and back layers and an interlayer, effectively prevents delamination, and is less likely to have white creases on folds. The present invention can also provide a heat shrinkable label formed from the heat shrinkable multilayer film.

DESCRIPTION OF EMBODIMENTS

Figure 1:
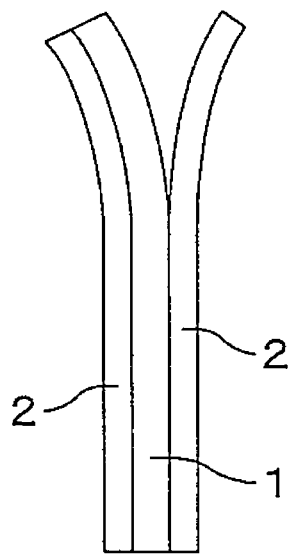
FIG. 1 is a schematic view showing a state of separating a film in evaluation of interlaminar strength.

The following will describe embodiments of the present invention in detail referring to examples, but the present invention is not limited to these examples.

The materials used in the examples and comparative examples are listed below.

(Polyester Resin)

PEs-1: a polyester resin (Vicat softening temperature: 69° C.) that contains a dicarboxylic acid component (100 mol % of terephthalic acid) and a diol component (65 mol % of a component derived from ethylene glycol, 12 mol % of a component derived from diethylene glycol, and 23 mol % of a component derived from 1,4-cyclohexane dimethanol)

PEs-2: a polyester resin (Vicat softening temperature: 85° C.) that contains a dicarboxylic acid component (100 mol % of terephthalic acid) and a diol component (68 mol % of a component derived from ethylene glycol, 2 mol % of a component derived from diethylene glycol, and 30 mol % of a component derived from 1,4-cyclohexane dimethanol)

(Polystyrene Resin)

PS-1: a styrene-butadiene copolymer (containing 78% by weight of styrene and 22% by weight of butadiene, Vicat softening temperature: 72° C., MFR: 5.6 g/10 min)

PS-2: a styrene-butadiene copolymer (containing 80% by weight of styrene and 20% by weight of butadiene, Vicat softening temperature: 75° C., MFR: 5.5 g/10 min)

PS-3: a styrene-butadiene copolymer (Asaflex 830, produced by Asahi Kasei Chemicals Corporation, Vicat softening temperature: 72° C., MFR: 6.1 g/10 min)

PS-4: a styrene-butadiene copolymer (CLEAREN 220M, produced by DENKI KAGAKU KOGYO KABUSHIKI KAISHA, Vicat softening temperature: 78° C., MFR: 7.2 g/10 min)

PS-5: a styrene-butadiene copolymer (CLEAREN 210M, produced by DENKI KAGAKU KOGYO KABUSHIKI KAISHA, Vicat softening temperature: 80° C., MFR: 8.8 g/10 min)

(Polyester Elastomer)

TPE-1: an elastomer consisting of a polyester as a hard segment and a polyether as a soft segment (PRIMALLOY A 1600N produced by Mitsubishi Chemical Corporation, melting point: 160° C., specific gravity: 1.00)

TPE-2: an elastomer consisting of a polyester as a hard segment and a polyether as a soft segment (Hytrel 4057 produced by DU PONT-TORAY CO., LTD., melting point: 163° C., specific gravity: 1.15)

(Polystyrene Elastomer)

TPE-3: a maleic anhydride-modified styrene-ethylene/butylene-styrene block copolymer (styrene content: 30% by weight, addition amount of maleic anhydride: 0.5% by weight, MFR: 4.0 g/10 min)

The Vicat softening temperatures were determined by a method in accordance with JIS K 7206 (1999). Specifically, a specimen was taken out from each polyester resin and from each polystyrene resin, a needle-shaped indenter was placed on the specimen, and a load of 10N was applied to the needle-shaped indenter. The temperature was raised at 120° C./h. The temperature at which the needle-shaped indenter was inserted into the specimen by 1 mm was considered as the Vicat softening temperature.

The MFRs were determined by a method in accordance with ISO 1133, by melting each polystyrene resin at 200° C. and measuring the ejection amount of the resin at a load of 5 kg for 10 min.

The melting points were determined by raising the temperature of each polyester elastomer at 10° C./min using a differential scanning calorimeter (DCS-60, produced by Shimadzu Corporation).

The specific gravity of each polyester elastomer was determined by a method in accordance with JIS K 7112 (1999), that is, by liquid displacement using ethanol as an immersion liquid (an electronic hydrometer MD-300S, produced by Alfa Mirage Co., Ltd.).

Example 1

A polyester resin (PEs-1) was used for a resin forming front and back layers.

A polystyrene resin (PS-1) was used for a resin forming an interlayer.

For resins forming adhesive layers, 85% by weight (85 parts by weight) of a polystyrene resin (PS-3) and 15% by weight (15 parts by weight) of a polyester elastomer (TPE-1) were used. The resins were charged in an extruder with a barrel temperature of 160° C. to 250° C., and extruded through a multilayer die at 250° C. into a five-layer sheet. The sheet was cooled and solidified in take-up rolls at 30° C. Subsequently, the sheet was stretched at a stretch ratio of six times in a tenter stretching machine having a preheating zone of 105° C., a stretching zone of 90° C., and a heat setting zone of 85° C. The stretched sheet was wound on a winder. Thus, a heat shrinkable multilayer film in which the direction orthogonal to the main shrinkage direction was MD and the main shrinkage direction was TD was obtained.

The heat shrinkable multilayer film had a five-layer structure of front or back layer (8 μm)/adhesive layer (1 μm)/interlayer (32 μm)/adhesive layer (1 μm)/front or back layer (8 μm), with a total thickness of 50 μm.

Example 2

A polystyrene resin (PS-2) was used for a resin forming an interlayer.

For resins forming adhesive layers, 70% by weight of a polystyrene resin (PS-3) and 30% by weight of a polyester elastomer (TPE-1) were used.

Other processes were performed in the same manner as in Example 1. Thus, a five-layer film consisting of front or back layer (10 μm)/adhesive layer (0.8 μm)/interlayer (28.4 μm)/adhesive layer (0.8 μm)/front or back layer (10 μm) was obtained.

Example 3

For resins forming adhesive layers, 50% by weight of a polystyrene resin (PS-3) and 50% by weight of a polyester elastomer (TPE-2) were used.

Other processes were performed in the same manner as in Example 1. Thus, a five-layer film consisting of front or back layer (5 μm)/adhesive layer (0.6 μm)/interlayer (23.8 μm)/adhesive layer (0.6 μm)/front or back layer (5 μm), with a total thickness of 35 μm was obtained.

Example 4

For resins forming adhesive layers, 70% by weight of a polystyrene resin (PS-3) and 30% by weight of a polyester elastomer (TPE-2) were used.

Other processes were performed in the same manner as in Example 1. Thus, a five-layer film consisting of front or back layer (7 μm)/adhesive layer (1.0 μm)/interlayer (24 μm)/adhesive layer (1.0 μm)/front or back layer (7 μm), with a total thickness of 40 μm was obtained.

Example 5

A polyester resin (PEs-2) was used for a resin forming front and back layers.

For resins forming adhesive layers, 75% by weight of a polystyrene resin (PS-4) and 25% by weight of a polyester elastomer (TPE-2) were used. A stretching process was performed at a stretch ratio of 5.5 times in a tenter stretching machine having a preheating zone at 110° C., and a stretching zone at 90° C. and a heat setting zone at 85° C. The stretched sheet was wound on a winder. Thereby, a heat shrinkable multilayer film in which the direction orthogonal to the main shrinkage direction was MD and the main shrinkage direction was TD was obtained.

Other processes were performed in the same manner as in Example 1. Thus, a five-layer film consisting of front or back layer (5 μm)/adhesive layer (1.0 μm)/interlayer (28 μm)/adhesive layer (1.0 μm)/front or back layer (5 μm), with a total thickness of 40 μm was obtained.

Example 6

For resins forming adhesive layers, 75% by weight of a polystyrene resin (PS-5) and 25% by weight of a polyester elastomer (TPE-2) were used.

Other processes were performed in the same manner as in Example 1. Thus, a five-layer film consisting of front or back layer (10 μm)/adhesive layer (1.0 μm)/interlayer (18 μm)/adhesive layer (1.0 μm)/front or back layer (10 μm), with a total thickness of 40 μm was obtained.

Comparative Example 1

For a resin forming adhesive layers, 100% by weight of a polystyrene resin (PS-3) was used.

Other processes were performed in the same manner as in Example 1. Thus, a five-layer film consisting of front or back layer (7 μm)/adhesive layer (1.0 μm)/interlayer (24 μm)/adhesive layer (1.0 μm)/front or back layer (7 μm), with a total thickness of 40 μm was obtained.

Comparative Example 2

For a resin forming adhesive layers, 100% by weight of a polyester elastomer (TPE-1) was used. Other processes were performed in the same manner as in Example 5. Thus, a five-layer film consisting of front or back layer (8 μm)/adhesive layer (1.0 μm)/interlayer (32 μm)/adhesive layer (1.0 μm)/front or back layer (8 μm), with a total thickness of 50 μm was obtained.

Comparative Example 3

For a resin forming adhesive layers, a polystyrene elastomer (TPE-3) was used. Other processes were performed in the same manner as in Example 5. Thus, a five-layer film consisting of front or back layer (6.5 μm)/adhesive layer (0.9 μm)/interlayer (30.2 μm)/adhesive layer (0.9 μm)/front or back layer (6.5 μm), with a total thickness of 45 μm was obtained.

Comparative Example 4

For resins forming adhesive layers, 25% by weight of a polystyrene resin (PS-3) and 75% by weight of a polyester elastomer (TPE-2) were used. Other processes were performed in the same manner as in Example 1. Thus, a five-layer film consisting of front or back layer (8 μm)/adhesive layer (1.0 μm)/interlayer (32 μm)/adhesive layer (1.0 μm)/front or back layer (8 μm), with a total thickness of 50 μm was obtained.

Comparative Example 5

For resins forming adhesive layers, 50% by weight of a polystyrene resin (PS-1) and 50% by weight of a polyester resin (PEs-1) were used. Other processes were performed in the same manner as in Example 1. Thus, a five-layer film consisting of front or back layer (6 μm)/adhesive layer (0.8 μm)/interlayer (26.4 μm)/adhesive layer (0.8 μm)/front or back layer (6 μm), with a total thickness of 40 μm was obtained.

Comparative Example 6

For resins forming adhesive layers, 75% by weight of a polystyrene resin (PS-3) and 25% by weight of a polyester resin (PEs-1) were used. Other processes were performed in the same manner as in Example 1. Thus, a five-layer film consisting of front or back layer (6 μm)/adhesive layer (1.0 μm)/interlayer (36 μm)/adhesive layer (1.0 μm)/front or back layer (6 μm), with a total thickness of 50 μm was obtained.

Comparative Example 7

For resins forming adhesive layers, 97% by weight of a polystyrene resin (PS-3) and 3% by weight of a polyester elastomer (TPE-2) were used. Other processes were performed in the same manner as in Example 1. Thus, a five-layer film consisting of front or back layer (6 μm)/adhesive layer (1.0 μm)/interlayer (26 μm)/adhesive layer (1.0 μm)/front or back layer (6 μm), with a total thickness of 40 μm was obtained.

(Evaluation)

The heat shrinkable multilayer films obtained in the examples and the comparative examples were evaluated as follows. Table 1 shows the results.

(1) Adhesive Strength (Adhesiveness) Before Printing

Figure 2:
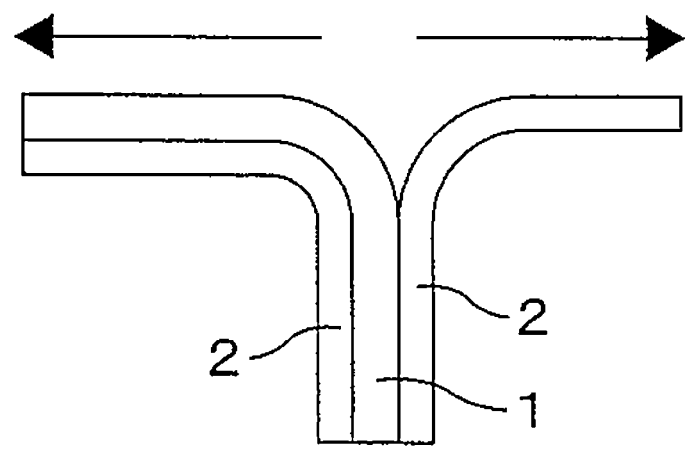
FIG. 2 is a schematic view showing a state of separating a film in evaluation of interlaminar strength.

The heat shrinkable multilayer film was cut into a size of 100 mm (in length)×10 mm (in width), and part of the film edge was delaminated as shown in FIG. 1. The layers were separated at a 180° angle at a tensile speed of 200 mm/min in the longitudinal direction of the sample as shown in FIG. 2. The strength at this time was measured using a peel tester (Peeling Tester HEIDON-17, produced by Shinto Scientific Co., Ltd.).

The test was performed 10 times in the both MD and TD. Thereby, the adhesive strengths in the MD and in the TD were determined. Also, the average of the both adhesive strengths in the MD and TD was determined so as to be able to prevent delamination caused by diagonally tearing the film when the film was tried to be torn along perforations.

If the measured values fluctuated due to zipping, the initial peak value was considered as the adhesive strength because the strength initiating delamination should be focused on.

The average adhesive strengths in the MD and in the TD and the average value of the both adhesive strengths in the MD and TD were evaluated according to the following criteria. If these values are evaluated as "o", delamination of the film caused by diagonally tearing the film when the film is tried to be torn along perforations may be prevented.

(Adhesive Strength in MD)

An adhesive strength of 100 g/cm or more was evaluated as "o", and an adhesive strength of less than 100 g/cm was evaluated as "x".

(Adhesive Strength in TD)

An adhesive strength of 50 g/cm or more was evaluated as "o", and an adhesive strength of less than 50 g/cm was evaluated as "x".

(Average Value in Both MD and TD)

An average value of 80 g/cm or more was evaluated as "o", and an average value of less than 80 g/cm was evaluated as "x".

(2) Adhesive Strength (Adhesiveness) after Printing

A black image was printed on the heat shrinkable multilayer film (film width: 500 mm) using Fine Star black (TOYO INK CO., LTD.), and then a white image was printed using Fine Star white (TOYO INK CO., LTD.), each by gravure printing. This provided a heat shrinkable multilayer film with a two-color-printed (black and white) back face. The printing plate was one produced by direct laser engraving with a plate depth of 30 μm and 175 lines.

The printed heat shrinkable multilayer film was cut into a size of 100 mm (in length)×10 mm (in width), and part of the film edge was delaminated as shown in FIG. 1. The layers were separated at a 180° angle at a tensile speed of 200 mm/min in the longitudinal direction of the sample as shown in FIG. 2. The strength at this time was measured using a peel tester (Peeling Tester HEIDON-17, produced by Shinto Scientific Co., Ltd.).

The test was performed 10 times in the both MD and TD, and the adhesive strengths in the MD and in the TD, and the average of the strengths in the both MD and TD were determined based on the average values of the measurement results. The film was evaluated according to the following criteria.

If the measured values fluctuated due to zipping, the initial peak value was considered as the adhesive strength because the strength initiating delamination should be focused on.

The adhesive strengths in the MD and in the TD and the average of the strengths in the both MD and TD were evaluated according to the following criteria. If these values are evaluated as "o", the film has sufficient anti-printability, which enables to prevent delamination caused by diagonally tearing the film when the film is tried to be torn along perforations.

(Adhesive Strength in MD)

An adhesive strength of 100 g/cm or more was evaluated as "o", and an adhesive strength of less than 100 g/cm was evaluated as "x".

(Adhesive Strength in TD)

An adhesive strength of 50 g/cm or more was evaluated as "o", and an adhesive strength of less than 50 g/cm was evaluated as "x".

(Average of the Strengths in Both MD and TD)

An average of 80 g/cm or more was evaluated as "o", and an average of less than 80 g/cm was evaluated as "x".

(3) Evaluation of Crease-Whitening

A black image was printed on the heat shrinkable multilayer film (film width: 500 mm) using Fine Star black (TOYO INK CO., LTD.), and then a white image was printed using Fine Star white (TOYO INK CO., LTD.), each by gravure printing. This provided a heat shrinkable multilayer film with a two-color-printed (black and white) back face. The printing plate was one produced by direct laser engraving with a plate depth of 30 μm and 175 lines.

Then, the heat shrinkable multilayer film was cut into a rectangle with a size of 100 mm (in MD)×200 mm (in TD) from the black printed part. This cutout sample was folded with the printed face inside and pressed twice by a rubber roller at a load of 2 kg and a speed of 2 sec/100 mm in parallel to the MD, so that a crease was formed. Then, the cutout sample was unfolded and pressed once by the rubber roller at a load of 2 kg and a speed of 2 sec/100 mm, so that the crease was smoothed out. Thereafter, the sample was immersed in warm water at 75° C. for 7 seconds using a jig capable of controlling the shrinkage rate in the TD, and thereby the film was shrunk by 5% in the TD. The appearance of the crease at this time was evaluated based on the following criteria.

Figure 3:
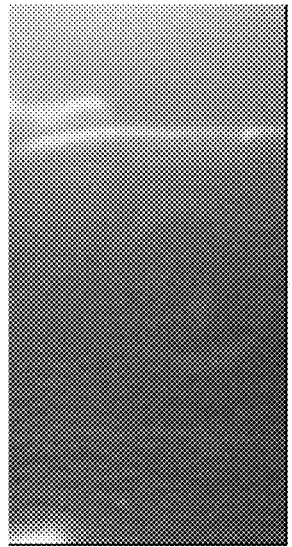
FIG. 3 is a photograph showing one example where no crease-whitening is observed in evaluation of crease-whitening.
Figure 4:
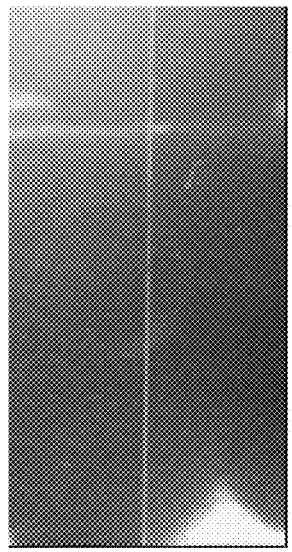
FIG. 4 is a photograph showing one example where crease-whitening is observed in evaluation of crease-whitening.

The appearance of the crease was evaluated as follows: light of a fluorescent lamp was applied onto the sample from an angle of 45°, and 10 persons visually observed the sample from the opposite side to the lamp at an angle of 45°. FIG. 3 shows one example where no crease-whitening was observed, and FIG. 4 shows one example where crease-whitening was observed.

o: None of the 10 persons observed crease-whitening.

Δ: One or two of the 10 persons observed crease-whitening.

x: Three or more of the 10 persons observed crease-whitening.

(4) Sealing Strength in MD

The heat shrinkable multilayer film was sealed using a solvent containing 40 parts by weight of cyclohexane for 100 parts by weight of 1,4-dioxolan, whereby forming a sealed portion in parallel to the MD with a width of 3 mm. The heat shrinkable multilayer film was cut into a size of 10 cm (in MD)×5 cm (in TD) such that the solvent sealed portion was placed in the center, and then part of the sealed edge was separated. The layers were separated at a 180° angle at a tensile speed of 200 mm/min in the longitudinal direction of the sample. The sealing strength at this time was measured using a peel tester (Peeling Tester HEIDON-17, produced by Shinto Scientific Co., Ltd.).

The test was performed ten times in the MD, and the average value was calculated. The average value was evaluated according to the following criteria. If the film was evaluated as "oo" or "o", separation at the sealed portion may be prevented even by an external force in the MD by a labeler or the like.

A sealing strength of 60 g or more was evaluated as "oo", a sealing strength of 40 g or more and less than 60 g was evaluated as "o", a sealing strength of 25 g or more and less than 40 g was evaluated as "Δ", and a sealing strength of less than 25 g was evaluated as "x".

(Total Evaluation)

o: no "x" in the evaluations (1) to (4)

x: one or more "x" in the evaluations (1) to (4)

TABLE 1

| Composition of resin (parts by weight) | | | Example 1 | Example 2 | Example 3 | Example 4 | Example 5 | Example 6 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|---|---|---|---|---|
| Front and back layers | | PEs-1 | 100 | 100 | 100 | 100 | — | — | 100 | — | — | 100 | 100 | 100 | 100 |
| | | PEs-2 | — | — | — | — | 100 | 100 | — | 100 | 100 | — | — | — | — |
| Interlayer | | PS-1 | 100 | — | — | 100 | — | — | 100 | — | — | 100 | 100 | 100 | 100 |
| | Polystyrene resin | PS-2 | 85 | — | — | — | — | — | — | — | — | — | — | — | 97 |
| | | PS-3 | — | 70 | 50 | 70 | — | — | — | — | — | 25 | — | 75 | — |
| | | PS-4 | — | — | — | — | 75 | 75 | — | — | — | — | 50 | — | — |
| | | PS-5 | — | — | — | — | — | — | — | — | — | — | — | — | — |
| | | PEs-1 | 15 | 30 | 50 | 30 | 25 | 25 | — | 100 | — | 75 | — | — | 3 |
| | Polyester elastomer | TPE-1 | — | — | — | — | — | — | — | — | — | — | — | — | — |
| | Polystyrene elastomer | TPE-2 | — | — | — | — | — | — | — | — | 100 | — | — | — | — |
| | | TPE-3 | — | — | — | — | — | — | — | — | — | — | — | — | — |
| | Polyester resin | PEs-1 | — | — | — | — | — | — | — | — | — | — | 50 | 25 | — |
| Evaluation | Adhesive strength before printing (g/cm) | MD | 142 | 150 | 137 | 144 | 126 | 150 | 36 | 142 | 134 | 140 | 61 | 45 | 35 |
| | | Evaluation | ○ | ○ | ○ | ○ | ○ | ○ | × | ○ | ○ | ○ | × | × | × |
| | | TD | 88 | 136 | 122 | 136 | 119 | 68 | 45 | 124 | 123 | 120 | 103 | 53 | 51 |
| | | Evaluation | ○ | ○ | ○ | ○ | ○ | ○ | × | ○ | ○ | ○ | ○ | ○ | × |
| | | Average of MD and TD | 115 | 143 | 130 | 140 | 123 | 109 | 41 | 133 | 128 | 130 | 82 | 49 | 43 |
| | Adhesive strength after printing (g/cm) | MD | 159 | 163 | 158 | 166 | 167 | 174 | 42 | 167 | 34 | 163 | 84 | 51 | 38 |
| | | Evaluation | ○ | ○ | ○ | ○ | ○ | ○ | × | ○ | × | ○ | ○ | × | × |
| | | TD | 71 | 120 | 135 | 124 | 98 | 52 | 32 | 145 | 58 | 141 | 67 | 37 | 44 |
| | | Evaluation | ○ | ○ | ○ | ○ | ○ | ○ | × | ○ | ○ | ○ | ○ | × | × |
| | | Average of MD and TD | 115 | 142 | 147 | 145 | 133 | 113 | 37 | 156 | 46 | 152 | 76 | 44 | 41 |
| | Evaluation of crease-whitening | | ○ | ○ | ○ | ○ | ○ | ○ | × | ○ | × | ○ | × | × | × |
| | Sealing strength (g) | MD | 42 | 60 | 68 | 62 | 52 | 55 | 15 | 80 | 38 | 70 | 21 | 24 | 15 |
| | | Evaluation | ○ | ○ | ○ | ○ | ○ | ○ | × | ○ | △ | ○ | × | × | × |
| Total evaluation | | | ○ | ○ | ○ | ○ | ○ | ○ | × | × | × | × | × | × | × |

The heat shrinkable multilayer films obtained in the examples achieved good results in all the evaluation items. In contrast, in the cases where the mixing ratio of the resins forming adhesive layers is out of the range specified by the present invention, such as in Comparative Examples 1 to 7, the films had low adhesive strengths, or left white creases caused by folding the films with a strong pressure in a solvent sealing process for attaching the films to containers, which resulted in poor appearance.

INDUSTRIAL APPLICABILITY

The present invention can provide a heat shrinkable multilayer film that has excellent adhesiveness between front and back layers and an interlayer, effectively prevents delamination, and is less likely to have white creases on folds. The present invention can also provide a heat shrinkable label formed from the heat shrinkable multilayer film.

REFERENCE SIGNS LIST

1: interlayer
2: front and back layers

The invention claimed is:

1. A heat shrinkable multilayer film, comprising:
front and back layers each comprising a polyester resin;
an interlayer comprising a polystyrene resin; and
adhesive layers,
wherein the front and back layers and the interlayer are stacked with the adhesive layers interposed therebetween,
each of the adhesive layers consists of from 55 to 85% by weight of a polystyrene resin and from 15 to 45% by weight of a polyester elastomer,
the polyester resin is obtained by polycondensation of a dicarboxylic acid component and a diol component,
the diol component comprises a component derived from 1, 4-cyclohexane dimethanol,
the polystyrene resin of the adhesive layer is different from the polystyrene resin of the interlayer,
the polystyrene resin of the interlayer is a styrene-butadiene copolymer having a styrene content of 78 to 90% by weight and a butadiene content of 10 to 22% by weight,
the polystyrene resin of the adhesive layer is a styrene-butadiene copolymer having a styrene content of 50 to 76% by weight and a butadiene content of 24 to 50% by weight, and
the polyester elastomer is a block copolymer consisting of a polyester and a polyalkylene ether glycol, the block copolymer comprising a polyalkylene ether glycol segment in an amount from 55 to 90% by weight, wherein the film does not form crease-whitening when the film is treated by being folded and pressed twice with a rubber roller at a load of 2 kg and a speed of 2 sec/100 mm in parallel to a machine direction of the film, and wherein the film has an adhesive strength in the machine direction of 100 to 200 g/cm, the adhesive strength being measured via separation at an angle of 180° and a tensile speed of 200 mm/min.

2. The heat shrinkable multilayer film according to claim 1,
wherein the polyester elastomer forming the adhesive layers has a melting point from 120° C. to 200° C.

3. The heat shrinkable multilayer film according to claim 1,
wherein the polyester elastomer forming the adhesive layers has a specific gravity from 0.95 to 1.20.

4. A heat shrinkable label formed of the heat shrinkable multilayer film according to claim 1.

5. The heat shrinkable multilayer film according to claim 1,
wherein the polyester forming the block copolymer in the polyester elastomer is an aromatic polyester.

6. The heat shrinkable multilayer film according to claim 1,
wherein in the polyester elastomer, the polyester of the block copolymer forms a hard segment and the polyalkylene ether glycol of the block copolymer forms a soft segment.

7. The heat shrinkable multilayer film according to claim 1, wherein
the polyester resin comprises a component derived from terephthalic acid as the dicarboxylic acid component, and
the adhesive layer has a thickness in a range from 0.3 μm to 3.0 μm.

* * * * *